May 2, 1967     O. F. HAMANN     3,317,728

ELECTROLUMINESCENT DISPLAY DEVICE USING PLASTIC FOAM

Filed July 14, 1964

INVENTOR.
OMER F. HAMANN

BY

*Robert L. Nathans*

ATTORNEY

# United States Patent Office 3,317,728
Patented May 2, 1967

3,317,728
ELECTROLUMINESCENT DISPLAY DEVICE USING PLASTIC FOAM
Omer F. Hamann, La Jolla, Calif., assignor, by mesne assignments, to Stromberg-Carlson Corporation, Rochester, N.Y., a corporation of Delaware
Filed July 14, 1964, Ser. No. 382,594
9 Claims. (Cl. 250—71)

The present invention relates to electroluminescent display devices.

It is well known that certain gases, such as neon, argon, or mercury vapor, ionize in the presence of an electric field. Under the proper conditions well known in the art, this ionization causes a gas discharge breakdown with the gas molecules losing electrons and regaining them by recombination. During recombination, electrons "drop back" into orbit and cause the emission of electromagnetic radiation which is often in the visible spectrum. This phenomenon is utilized in relatively fragile neon signs. However, for certain applications, such as military applications, ruggedness is an important requirement.

Accordingly, it is a principal object of the present invention to provide a novel electroluminescent display device which is inexpensive to manufacture and is quite rugged.

Other objects and advantages of the invention will become apparent as the following description proceeds and the features of novelty which characterize the invention will be pointed out with particularity in the claims annexed to and forming a part of this specification.

Figure 1:
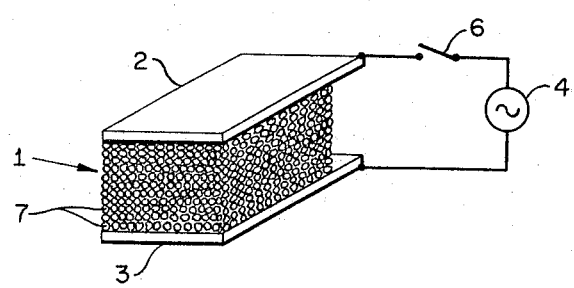

For a better understanding of the invention, reference may be had to the accompanying drawing, in which:

FIG. 1 discloses a first embodiment of the present invention; and

Figure 2:
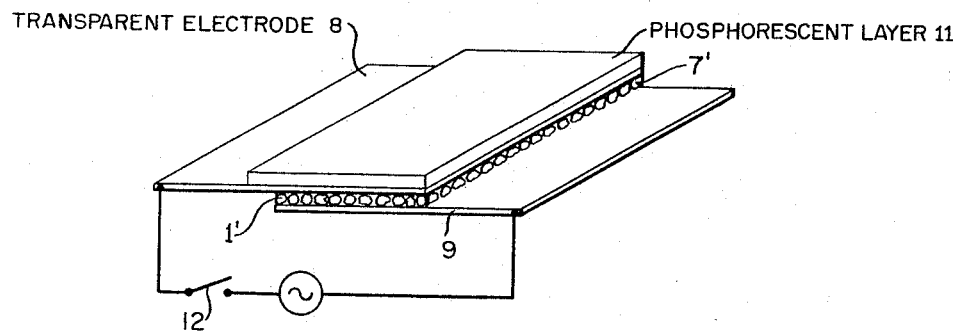

FIG. 2 discloses a second embodiment of the present invention.

In accordance with the present invention, a solid foam body is provided having a large plurality of small cellular compartments containing a gas which ionizes when subjected to an electric field, thereby to emit electromagnetic radiation. Such a body is fabricated by blowing the aforesaid gas into a plastic in the same manner as the fabrication of plastic foam bodies known in the trade as "externally blown" foam which contain carbon dioxide. Polystyrene and epoxy foam bodies are thusly fabricated and are widely utilized in the packing and building fields. Many of these plastics are translucent. Although the present invention could utilize these plastics, greater efficiency may be had by employing a transparent "externally blown" plastic such as acrylic-styrene manufactured by the Dow Chemical Company.

FIG. 1 discloses a preferred embodiment of the present invention. Solid foam body 1 is sandwiched between electrodes 2 and 3 which are coupled to voltage source 4 through switch 6. Solid foam body 1 comprises numerous cellular compartments 7 containing at least one gas which emits light owing to the alternating electric field set up throughout the solid foam body by electrodes 2 and 3. As mentioned hereinabove, the solid foam body may be composed of a plastic material which is transparent to light so that the structure of FIG. 1 functions as an electroluminescent display device upon the closure of switch 6. If desired, solid foam body 1 could be extremely thin so that only one or two layers of cellular compartments 7 are utilized. The resulting compactness yields a distinct advantage, and the use of my device in micromodules is obvious.

FIG. 2 discloses solid foam body 1' which is composed of only one layer of cellular compartments 7' sandwiched between transparent electrode 8 and electrode 9. A phosphorescent layer 11 is applied to transparent electrode 8 by any of the well known techniques. The closure of switch 12 causes the creation of an electric field within solid foam body 1' resulting in the emission of electromagnetic radiation, such as light, which in turn causes phosphorescent layer 11 to emit a particular wavelength of visible light. The embodiment of FIG. 2 is useful where the desired visible radiation differs from the light or other electromagnetic radiation which would be produced by the ionization of the gas contained within cellular compartments 7'. Multicolor effects may be produced by applying different phosphorescent layers to transparent electrode 8.

While there has been shown and described a specific embodiment of the invention, other modifications will readily occur to those skilled in the art. It is not, therefore, desired that this invention be limited to the specific arrangement shown and described, and it is intended in the appended claims to cover all modifications within the spirit and scope of the invention.

What is claimed is:

1. In combination, a source of primary radiation comprising a solid foam body having a plurality of cellular compartments at least some of which contain a gas which ionizes and emits electromagnetic radiation when subjected to an electric field, means generating an electric field within said solid foam body for producing generation within and emission from said body of said electromagnetic radiation, said solid foam body being composed of a substance transparent to said electromagnetic radiation.

2. The combination as set forth in claim 1 wherein said electromagnetic radiation lies within the visible spectrum.

3. A combination as set forth in claim 1 further including a phosphorescent layer adjacent to said solid foam body in sufficient proximity to intercept said emitted electromagnetic radiation, said phosphorescent layer emitting primary visible radiation in response to irradiation by said emitted electromagnetic radiation.

4. The combination as set forth in claim 3 wherein an electrode is positioned between said phosphorescent layer and said solid foam body for supporting said phosphorescent layer, the last-named electrode being transparent to said electromagnetic radiation.

5. In combination, a source of primary radiation comprising a solid foam body having a plurality of cellular compartments at least some of which contain a gas which ionizes and emits electromagnetic radiation having a first frequency when subjected to an electric field, means generating an electric field within said solid foam body for producing generation within and emission from said body of said electromagnetic radiation having a first frequency, said solid foam body being composed of substances transparent to said electromagnetic radiation, a phosphorescent layer adjacent to said solid foam body emitting electromagnetic radiation having a second frequency in response to irradiation by said electromagnetic radiation having a first frequency.

6. The combination as set forth in claim 5 wherein an electrode is positioned between said phosphorescent layer and said solid foam body for supporting said phosphorescent layer, the last-named electrode being transparent to said electromagnetic radiation having said first frequency.

7. The combination defined in claim 1, wherein said means generating a field within said solid foam body consists of first and second conductive layers having said solid foam body disposed therebetween, and a source of alternating voltage selectively connected between said first and second conductive layers.

8. The combination as set forth in claim 5, wherein the thickness of said solid foam body is substantially equal to one layer of said cellular compartments.

9. The combination as set forth in claim 5, wherein said means generating a field within said solid foam body consists of first and second conductive layers having said solid foam body disposed therebetween, and a source of alternating voltage selectively connected between said first and second conductive layers.

References Cited by the Examiner

UNITED STATES PATENTS

| | | | |
|---|---|---|---|
| 2,924,732 | 2/1960 | Lehmann | 250—71 X |
| 2,945,305 | 7/1960 | Strickler | 250—71 X |
| 3,037,137 | 5/1962 | Motson | 250—71 X |

ARCHIE R. BORCHELT, *Primary Examiner.*